United States Patent
Bronnenberg et al.

(10) Patent No.: US 8,713,199 B2
(45) Date of Patent: Apr. 29, 2014

(54) METHOD AND SYSTEM FOR FILTERING HOME-NETWORK CONTENT

(75) Inventors: Wilhelmus Josephus Herman Jan Bronnenberg, Eindhoven (NL); Maarten Peter Bodlaender, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 402 days.

(21) Appl. No.: 10/597,047

(22) PCT Filed: Dec. 20, 2004

(86) PCT No.: PCT/IB2004/052869
§ 371 (c)(1),
(2), (4) Date: Jul. 10, 2006

(87) PCT Pub. No.: WO2005/079071
PCT Pub. Date: Aug. 25, 2005

(65) Prior Publication Data
US 2007/0168051 A1    Jul. 19, 2007

(30) Foreign Application Priority Data
Jan. 13, 2004  (EP) .................................... 04100096

(51) Int. Cl.
*G06F 15/16* (2006.01)

(52) U.S. Cl.
USPC ............ 709/246; 709/204; 709/226; 709/231

(58) Field of Classification Search
USPC .................................. 709/246, 204
See application file for complete search history.

(56) References Cited

U.S. PATENT DOCUMENTS

| 5,835,700 | A | * | 11/1998 | Carbonneau et al. | ............ 714/44 |
| 6,049,821 | A | * | 4/2000 | Theriault et al. | ............... 709/203 |
| 6,065,055 | A | * | 5/2000 | Hughes et al. | ................ 709/229 |
| 2002/0078161 | A1 | * | 6/2002 | Cheng | .......................... 709/208 |

(Continued)

FOREIGN PATENT DOCUMENTS

| JP | 2001357008 A | 12/2001 |
| JP | 2001359050 A | 12/2001 |

(Continued)

OTHER PUBLICATIONS

Ritchie et al: "UPnP AV Architecture:0.83"; Design Document Microsoft, Jun. 2002, pp. 1-22.

(Continued)

*Primary Examiner* — Phuoc Nguyen
*Assistant Examiner* — Clarence John

(57) ABSTRACT

A method for filtering and storing information about content which is available on a network device of many network devices in a network includes filtering the information by removing information about content which cannot be rendered by at least one of the network devices adapted for rendering content, storing the filtered information and making it available on the network. When the network is a UPnP network, then control points have faster reaction times when they browse a content directory that includes the stored filtered information. For reducing load on the content directory service, the control point and the network is obtained when the control point browses the content directories. Further, the content presented to the user on the user screen of a control point only comprises content which can be used.

19 Claims, 2 Drawing Sheets

(56) References Cited

U.S. PATENT DOCUMENTS

| | | |
|---|---|---|
| 2002/0107850 A1 | 8/2002 | Sugimoto et al. |
| 2002/0143780 A1* | 10/2002 | Gorman ............... 707/100 |
| 2003/0009484 A1* | 1/2003 | Hamanaka et al. ........... 707/200 |
| 2003/0023671 A1* | 1/2003 | Abdulrahiman et al. ..... 709/203 |
| 2003/0074473 A1* | 4/2003 | Pham et al. ............... 709/246 |
| 2003/0126086 A1* | 7/2003 | Safadi ............... 705/51 |
| 2004/0193609 A1* | 9/2004 | Phan et al. ............... 707/10 |
| 2004/0267731 A1* | 12/2004 | Gino Monier et al. ........... 707/3 |
| 2005/0193060 A1* | 9/2005 | Barton ............... 709/204 |

FOREIGN PATENT DOCUMENTS

| | | | |
|---|---|---|---|
| JP | 2003101526 A | 4/2003 | |
| JP | 2003178036 A | 6/2003 | |
| JP | 2003228636 A | 8/2003 | |
| WO | 0237217 A2 | 5/2002 | |
| WO | 03042915 A1 | 5/2003 | |

OTHER PUBLICATIONS

UPnP Forum: "Connection Manager:1 Service Template Version 1.01"; Jun. 2002, pp. 1-25.

"Universal Plug and Play Device Architecture"; Version 1.0, Jun. 8, 20000, 1999-2000 Microsoft Corporation, pp. 1-54.

* cited by examiner

METHOD AND SYSTEM FOR FILTERING HOME-NETWORK CONTENT

FIELD OF THE INVENTION

The present invention relates to a method for filtering and storing information about content, which is available on a network device in a network and a device for filtering and storing information about content, which is available on a network device in a network.

BACKGROUND OF THE INVENTION

"Universal Plug and Play (UPnP) is architecture for pervasive peer-to-peer network connectivity of intelligent appliances, wireless devices, and PCs of all form factors. It is designed to bring easy-to-use, flexible, standards-based connectivity to ad-hoc or unmanaged networks whether in the home, in a small business, public spaces, or attached to the Internet. Universal Plug and Play is a distributed, open networking architecture that leverages TCP/IP and the Web technologies to enable seamless proximity networking in addition to control and data transfer among networked devices in the home, office, and public spaces. The UPnP standard is defined in the document "Universal Plug and Play Device Architecture", Version 1.0, Jun. 8, 2000, (c) 1999-2000 Microsoft Corporation.

UPnP AV specifications define the interaction model between UPnP AV devices and associated control points. UPnP AV devices include TVs, VCRs, CD/DVD players, set-top boxes, stereo systems, still-image cameras, electronic picture frames, and PCs. The UPnP AV architecture allows devices to support various types of entertainment content such as MPEG2 and MPEG4 for video, JPEG for pictures, and MP3 for audio. It also allows various types of transfer protocols such as HTTP and Real-time Transport Protocol (RTP).

UPnP AV specifications define two types of logical devices on the home network: Media Servers and Media Renderers. They also define four "services" hosted by servers and renderers:

The Content Directory Service (CDS) enumerates the available "content" (videos, music, pictures, and so forth).

The Connection Manager Service determines how the content can be transferred from the Media Server to the Media Renderer devices.

The AV Transport Service controls the flow of the content (play, stop, pause, seek, etc.).

The Rendering Control Service controls how the content is played (volume/mute, brightness, etc.).

The UPNP Content directory Service (CDS) is a standard that allows devices to advertise the content they store on the network. Other devices (so-called Control Points) can send, browse and query actions to the CDS and thus look through the collection, obtaining meta-data about content like title, authors, media type, supported formats and supported DRM systems. Control Points can set up streams to play the content from the CDS on other devices (for example on a UPnP TV). Typically, to set up a stream, supported formats and DRM systems have to match on source and sink devices.

The meta-data offered by the CDS is used by Control Points to show it to users, and is used for selecting (searching) of particular content. Especially, it can be used to restrict the content shown to the user to that subset, which is really valid in the current circumstances. For example, content with a format/DRM system that cannot be rendered on a selected/anticipated Renderer might not be shown to the user. Alternatively, control points first allow users to select content, and subsequently select a compatible Renderer.

Experiments with prototypes of CDS in consumer electronics products have shown that browsing through the available information about content by (all) control points in the home network can put a significant load on all involved devices and on the network. A related problem is that Control Points often show all available content to a user, even content that cannot be used on any other device in the home. This is irritating to the user when he selects that content, only to find out that it is presented in the wrong format or wrong DRM system.

OBJECT AND SUMMARY OF THE INVENTION

It is an object of the present invention to solve the above mentioned problems.

This is obtained by a method of filtering and storing information about content, which is available on a network device in a network, wherein said network further comprises network rendering devices adapted for rendering content, the method comprises the steps of:

filtering said information by removing information about content, which cannot be rendered by at least one of said network devices adapted for rendering content, storing said filtered information in a database and making said stored information available on the network.

Thereby stored information is obtained, which identifies content being compatible with at least one network rendering device in a network. The stored information could be made available through e.g. a separate interface, protocol, etc. This information can then be selected before trying to initiate a rendering process, and using this information it can be ensured that only possible rendering processes are selected, or that only content, which can be rendered, is made visible to a user trying to activate a rendering process. When the network is a UPnP network, then control points have faster reaction times when they browse the content directory service—the content directory being the stored filtered information. Further, less load on the content directory service, the control point and the network is obtained when the control point browses the content directories. Further, the content presented to the user on the user screen of a control point only comprises content, which can be used.

In an embodiment content which cannot be rendered by a network rendering device comprises content having a file format, which is not compatible with the network rendering devices. Incompatibility between file format of content and the file formats that can be processed by a rendering device is often a reason for a rendering process not being possible.

In an embodiment content, which cannot be rendered by a network rendering device comprises content having a transport protocol, which is not compatible with the network rendering devices.

In an embodiment content, which cannot be rendered by a network rendering device comprises content having a DRM system, which is not supported by any of the network rendering devices.

In a specific embodiment said method of filtering and storing information about content is performed in predefined time intervals. Thereby the stored information is kept updated even if a network rendering device is removed or added, or if a feature of a network rendering device is changed. By performing the update in predefined time intervals, the update process can easily be implemented without requiring "I am here" information from the network rendering devices.

In an embodiment the method of filtering and storing information about content is performed when a new network rendering device enters the network. This ensures that the filtered information is always updated and in compliance with the current network state, when a network rendering device is entered in the network.

In an embodiment said method of filtering and storing information about content is performed when a network rendering device is removed from the network. This ensures that the filtered information is always updated and in compliance with the current network state, when a network rendering device is removed.

In an embodiment said method of filtering and storing information about content is performed when a network device has been removed for a predefined time interval. Thereby, if for some reason a network rendering device is shortly removed for maintenance or because of a network failure, the filtered information is not changed and network load is minimised. Further, "flickering" behaviour of user interfaces on temporary network glitches is avoided.

In an embodiment the network is a UPnP network, and the information about content being available on a network device is the content information stored by an UPnP content directory service. Especially in an UPnP network the present invention is advantageous, because functionality already exists where a control point checks a content directory using a content directory service. By filtering the content directory service a control point has faster reaction times when it browses the content directory service—the content directory being the stored filtered information. Further, less load on the content directory service, the control point and the network is obtained when the control point browses the content directories. Further, the content presented to the user on the user screen of a control point only comprises content, which can be used.

In an embodiment the method further comprises storing said removed information about content, which cannot be rendered by at least one of said network devices adapted for rendering content and making said stored information available on the network. By storing this information it can still be accessed and used for determining necessary upgrades in the network. In a UPNP network a separate content directory service action for browsing hidden content could be added to the CDS. This would allow a control point to explicitly query, which information has been removed by the filter. This can be useful for control points that want to upgrade the network by e.g. downloading and installing new codecs, adapting security parameters or suggesting the user to buy new network rendering devices. The service could e.g. return additional meta-data fields providing human readable explanations describing why the content is unusable.

The invention further relates to a filtering device adapted for filtering and storing information about content, which is available on a network device in a network, wherein said network further comprises network rendering devices adapted for rendering content, the network device further comprises:

means for filtering said information by removing information about content, which cannot be rendered by at least one of said network devices adapted for rendering content, means for storing said filtered information in a database and making said stored information available on the network.

In an embodiment the filtering device is adapted for filtering and storing information about content, which is available on a network device in a network, wherein said filtering device is comprised in said network device.

The filtering device for performing the method defined above could e.g. be implemented within the network device comprising the content, or in a separate remote proxy being connected to the network device comprising the content.

BRIEF DESCRIPTION OF THE DRAWINGS

In the following preferred embodiments of the invention will be described referring to the figures, where.

DESCRIPTION OF PREFERRED EMBODIMENTS

Figure 1:
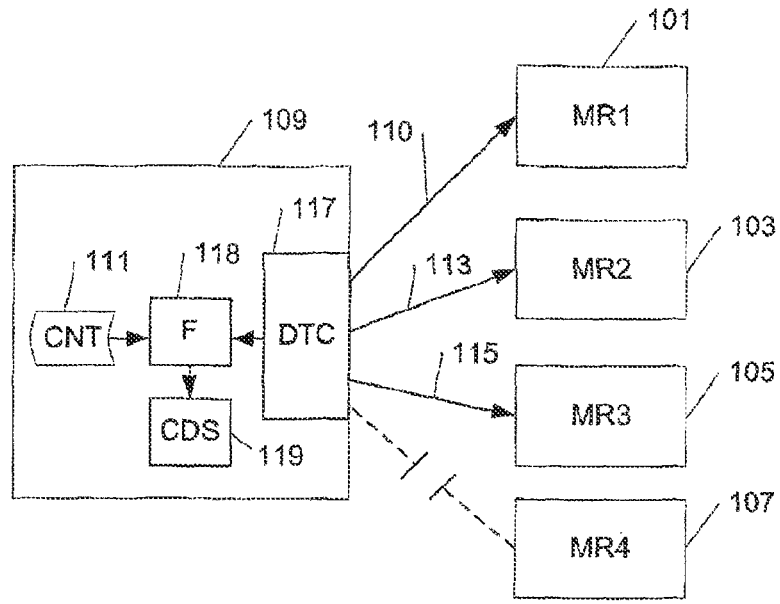
FIG. 1 illustrates a network comprising network rendering devices and a network device comprising content, wherein the network device comprises means for filtering and storing information about the content stored on the network device.

In FIG. 1 a network is illustrated comprising network rendering devices 101, 103, 105, 107 and a network device 109 comprising content stored in a database 111. The network device 109 is adapted for sharing the content with the network rendering devices 101, 103, 105, 107 through network connections 110, 113, 115 between the network rendering devices and the network device 109. The content in the database 111 could e.g. be video content or audio content, and the media renderers 101, 103, 105, 107 could be devices adapted for playing back the content such as a TV, videos, DVD, HIFI systems, etc. Due to incompatibility between some of the content in the database 111 and some of the network rendering devices 101, 103, 105, 107 and some of the content in the database 111 might not be compatible with any of the network rendering devices 101, 103, 105, 107. Incompatibility could e.g. be due to:

The content format of the content in the database 111 is not supported by the network rendering device 101, 103, 105, 107.

The network rendering device does not support a DRM (Digital Right Management) system, which matches the content in database 111.

The network connection through which DRM protected content in the database 111 is transferred to the network rendering device 101, 103, 105, 107 is not allowed by the content specific DRM system (e.g. due to security issues, such as lack of firewall or wrongly configured firewall).

The network connection to an external content provider services is currently not functional. This is especially relevant if the content is not stored locally in a home network, but stored on an Internet server and proxied in the home.

According to the present invention the network device 109 comprises detection means 117 for identifying network rendering device features such as supported formats, transport protocols and DRM system. Using filtering means 118 this information is compared to the available content in the database 111. Based on this comparison information about available content is filtered and stored in a database also referred to as a content directory 119, and it is ensured that content, which is offered in the content directory 119 is limited to content being compatible with the connected network rendering devices 101, 103, 105, 107. Different ways of determining incompatibilities could comprise one of the following:

1. For each piece of content in the database 111, determining all features, which could result in incompatibility, the features comprise information such as content file format, DRM protection of content, etc. For each piece of content checking whether a network rendering device 101, 103, 105, 107 exists, which is not incompatible with the content.
2. For all available content the database 111 determining all features which could result in incompatibility, the features comprising information such as content file formats, different DRM protection systems, etc. For each feature checking whether at least one network rendering device 101, 103, 105, 107 exists, which is not incompatible with the content.
3. Detecting all the features of the content and all the features of the network rendering devices 101, 103, 105, 107 and determining whether the content in the database 111 is compatible with at least one of the network rendering devices 101, 103, 105, 107.

In the event that it cannot be determined or there is doubt whether content can be rendered or not by the network rendering devices, the content identification will not be removed when filtering, instead it could e.g. be flagged with a comment such as "questionable if it can be rendered".

In all the examples a content directory 119 is obtained identifying only the subpart of the pieces of content in database 111 being compatible with at least one of the connected network rendering devices 101, 103, 105, 107.

The compatibility check should be performed periodically to ensure that the content identified in the content directory 119 is kept updated when the network state changes, either because the features of the network rendering devices change (new file formats are supported by a network rendering device because of a software update at the network rendering device) or because a network rendering device is added or removed from the network. In FIG. 1 an example is illustrated where a network rendering device 107 is removed from the network, then the content identified in the content directory 119, which was only supported by the network rendering device 107 is no longer compatible with any of the network rendering devices 101, 103, 105, 107, and the identified content in the content directory 119 should be updated by removing relevant content identifications.

Figure 2:
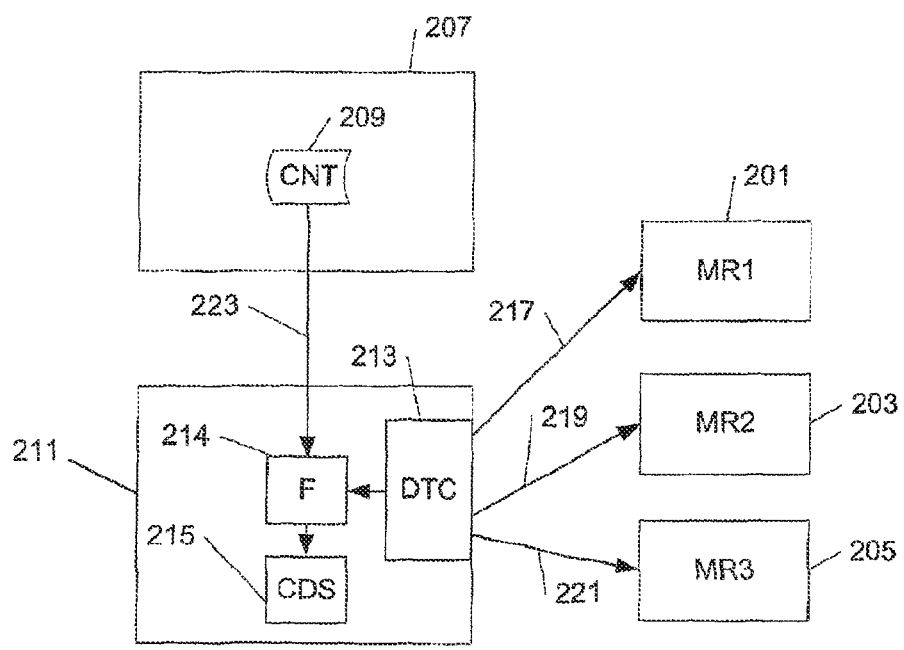
FIG. 2 illustrates another embodiment of a network comprising rendering devices and a network device comprising content, wherein the network further comprises means for filtering and storing information about the content stored on the network device.

In FIG. 2 another embodiment of a network is illustrated comprising network rendering devices 201, 203, 205 and a remote network device 207 comprising a database 209 with content. In this embodiment the network device 211 acts as a proxy for remote content 209 stored in the remote network device 207. The proxy 211 is adapted for sharing the content 209 with the network rendering devices 201, 203, 205 through network connections 217, 219, 221 between the network rendering devices and the remote network device 207. This example has similar functionality as the example described using FIG. 1, and the proxy 211 functions similar to the network device 109, where detection means 213 for identifying renderer features are comprised in the proxy 211 together with the filtering means 214. In this example, information about content is retrieved from the remote device 207 using a network connection 223. The generated content directory 215 is illustrated as stored in the proxy 211, but alternatively the proxy 211 could remotely store the content directory 215 in the remote device 207.

Figure 3:
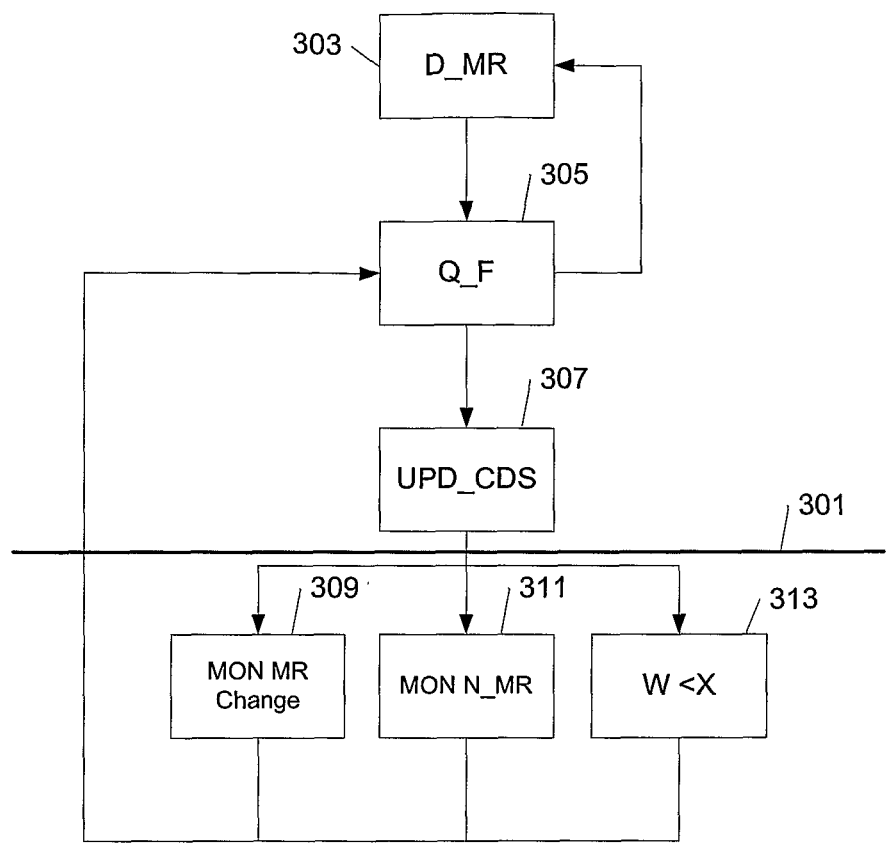
FIG. 3 illustrates the method of filtering and storing information about the content stored on the network device.

A possible embodiment of the invention is a network device, which contains a content storage medium like a harddisk and can be connected to a network, for example using wired Ethernet 802.3. This device implements the UPnP MediaServer functionality to share part of the stored content with other devices on the network. In addition, the device implements UPNP control point functionality In FIG. 3 a method is illustrated according to the above embodiment for filtering and storing information about content according to the present invention being used in an UPnP network. The method is divided by a line 301 in an initialisation phase (above the line 301) and an updating phase (below the line 301).

Initially in 303 all network rendering devices are discovered using the UPnP-defined SSDP protocol. Then, in 305 for each discovered network rendering device the features are determined by query all supported file formats & transport protocols (e.g. by using the ConnectionManager::GetProtocolInfo ( ) action of the Connection manager of the discovered network rendering device).

Next, in 307 the filtered information is determined according to the following rules:

a. Content A that is available in media formats M1 . . . Mn is not shared if no network rendering device supported one of these formats in the last X seconds [where X is configurable].
b. Content A that is available on transport protocols T1 . . . Tk is not shared if no network rendering device supported one of these formats in the last X seconds [where X is configurable].

Now the filtered information has been stored, and the update phase is started, the update phase comprises three parallel processes 309, 311 and 313 where the network is monitored for changes.

In 309 the network is monitored for feature changes e.g. caused by updates of the existing network rendering devices, whereby it can support new file formats or new transport protocols. When a change is detected, then the method returns to 305 where the type of change is determined and to 307 where the filtered information is determined. In UPnP a transport protocol change could be by discovered by a change in the state variable sinkProtocolInfo.

In 311 the network is monitored for changes related to new network rendering devices entering the network, this could in UPNP network e.g. be discovered if an SSDP Announce message is received of a new rendering device. When a change is detected then the method returns to 305 where the type of change is determined and to 307 where the filtered information is determined.

In 313 the network is monitored for changes related to new network rendering devices by periodically (in specified time intervals) performing a search. This could e.g. be performed in UPNP by performing an SSDP M-SEARCH to check for new rendering devices that failed to successfully send an SSDP Announce message on joining the network. When a change is detected, then the method returns to 305 where the type of change is determined and to 307 where the filtered information is determined.

Figure 4:
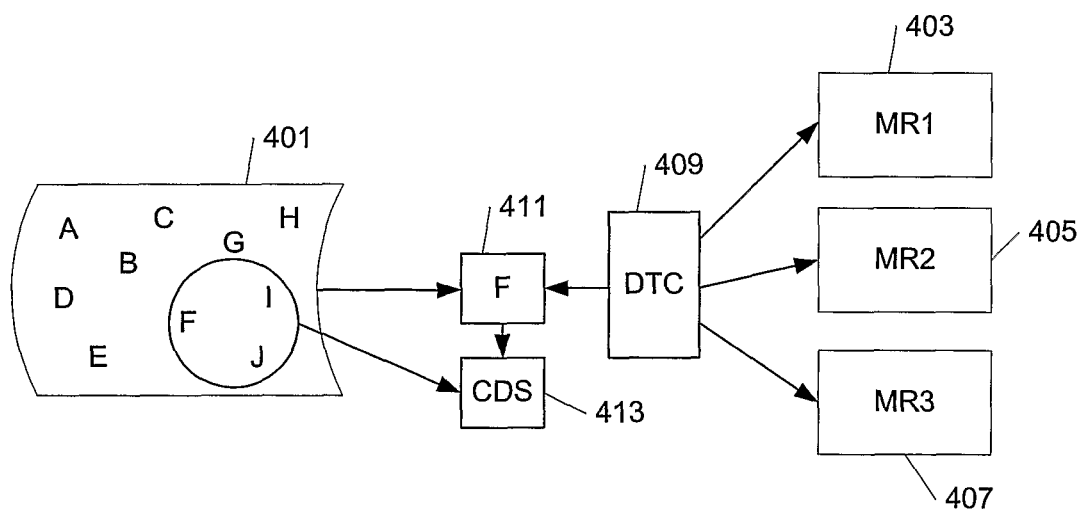
FIG. 4 illustrates information about content stored on the network device, after having been filtered.

In FIG. 4 the content of the filtered information is illustrated. The content A, B, C, D, E, F, G, H, I, J are stored in the database 401 on a network device in a network. The network further comprises the network rendering devices 403, 405, 407. The detection means 409 identifies network rendering device features and using filtering means 411 this information is compared to the available content in the database 401. Based on this comparison, information about available content in the database 401 is filtered and stored in a database also referred to as a content directory 413, and it is ensured that content, which is offered in the content directory 413 is limited to content being compatible with the connected network rendering devices 403, 405, 407—in this case only content F, I, and J.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of filtering and storing information describing characteristics of content stored on at least one network device and accessible via a network, said content being potentially useable by a plurality of network rendering devices adapted for rendering content, the method comprising the acts of:
    periodically filtering the information describing characteristics of the content to yield filtered information and remaining information, the filtered information being devoid of information describing characteristics of content that cannot be rendered by any of the plurality of network rendering devices;
    storing, in a content directory, the filtered information devoid of information describing characteristics of content that cannot be rendered by any of said plurality of network rendering devices;
    determining that the remaining information cannot be rendered by any of the plurality of network rendering devices for forming removed information;
    storing the removed information removed by the periodically filtering act;
    searching or browsing the content directory to review said filtered information devoid of information describing characteristics of content that cannot be rendered by any of the plurality of network rendering devices; and
    searching the removed information describing characteristics of content that cannot be rendered by any of the plurality of network rendering devices,
    wherein said searching or browsing of the content directory to review said filtered information devoid of information describing characteristics of content that cannot be rendered by any of the plurality of network rendering devices, is performed independently of said periodic filtering of information about the content to yield filtered information devoid of information describing characteristics of content that cannot be rendered by any of the plurality of network rendering devices, and
    wherein said periodic filtering of information about the content to yield filtered information devoid of information describing characteristics of content that cannot be rendered by any of the plurality of network rendering devices, is performed upon elapse of a predetermined time interval following removal from the network of a network rendering device of the plurality of network rendering devices.

2. The method as claimed in claim 1, further comprising the acts of:
    determining that the remaining information include questionable content having doubt as to whether the questionable content can be rendered by any of said plurality of network rendering devices; and
    flagging the questionable content with a comment indicating that there is doubt as to whether the questionable content can be rendered by any of said plurality of network rendering devices.

3. The method as claimed in claim 1, wherein content that cannot be rendered by any of the plurality of network rendering devices, comprises content having a format or a transport protocol that is not compatible with any of the plurality of network rendering devices.

4. The method as claimed in claim 1, wherein content that cannot be rendered by any of the plurality of network rendering devices, comprises content having a DRM system that is not supported by any of the plurality of network rendering devices.

5. The method as claimed in claim 1, wherein said periodic filtering of information about the content to yield filtered information devoid of information describing characteristics of content that cannot be rendered by any of the plurality of network rendering devices, is repeated over a predefined time interval.

6. The method as claimed in claim 1, wherein said periodic filtering of information about the content to yield filtered information devoid of information describing characteristics of content that cannot be rendered by any of the plurality of network rendering devices, is performed when a network rendering device of the plurality of network rendering devices is removed from the network.

7. The method as claimed in claim 1, wherein said periodic filtering of information about the content to yield filtered information devoid of information describing characteristics of content that cannot be rendered by any of the plurality of network rendering devices, is performed when a new network rendering device is added to the network.

8. The method as claimed in claim 1, wherein the network is a UPnP network, and the information describing characteristics of the content is stored by a UPnP content directory service.

9. The method as claimed in claim 1, wherein said method further comprises the act of:
    selecting content for transfer via the network to any one of the network rendering devices, wherein said selecting is based on the searching or browsing act, and wherein said content selected for transfer is renderable by any of the plurality of network rendering devices.

10. The method as claimed in claim 1, wherein the act of storing removed information comprises the act of:
    periodically filtering information describing characteristics of the content to yield filtered information including information describing characteristics of content that cannot be rendered by any of the plurality of network rendering devices, and making available on the network said filtered information including information describing characteristics of content that cannot be rendered by any of the plurality of network rendering devices.

11. The method as claimed in claim 10, wherein said method further comprises the act of:
    initiating an action based on said filtered information including information describing characteristics of content that cannot be rendered by any of the plurality of network rendering devices, wherein the action comprises any of the following:

a) upgrading the network;
b) downloading and/or installing a codec;
c) adapting a security parameter;
d) recommending the purchase or upgrade of at least one network rendering device; and
e) providing a human-perceptible explanation of why content is unusable by the at least one network rendering device.

12. The method of claim 1, wherein the act of searching the removed information comprises the acts of:
accessing the removed information; and
determining upgrades of the network based on the accessing act.

13. The method of claim 1, wherein the removed information are hidden content hidden from a user when performing the searching or browsing act.

14. The method of claim 1, further comprising the act of providing a human-perceptible explanation of why content removed by the periodically filtering act is unusable by the at least one network rendering device.

15. A device adapted for filtering and storing information describing characteristics of content accessible via a network, said content being potentially useable by a plurality of network rendering devices adapted for rendering content, the device comprising:
at least one filtering element adapted to periodically filter the information describing characteristics of the content to yield filtered information and remaining information, the filtered information being devoid of information describing characteristics of content that cannot be rendered by any of the plurality of network rendering devices; and
a storage element containing a content directory including the filtered information devoid of information describing characteristics of content that cannot be rendered by any of the plurality of network rendering devices;
wherein the storage element further contains removed information removed by the at least one filtering element;
wherein the content directory is searchable or browseable to enable review of said filtered information devoid of information describing characteristics of content that cannot be rendered by any of the plurality of network rendering devices, and searching or browsing of the content directory to review said filtered information devoid of information describing characteristics of content that cannot be rendered by any of the plurality of network rendering devices is performed independently of said periodic filtering by the at least one filtering element to yield filtered information devoid of information describing characteristics of content that cannot be rendered by any of the plurality of network rendering devices, and
wherein the content directory is searchable or browseable to enable review of said removed information, and
wherein said periodic filtering of information about the content to yield filtered information devoid of information describing characteristics of content that cannot be rendered by any of the plurality of network rendering devices, is performed upon elapse of a predetermined time interval following removal from the network of a network rendering device of the plurality of network rendering devices.

16. The device of claim 15, further comprising a processor configured to:
determine that the remaining information include questionable content having doubt as to whether the questionable content can be rendered by any of said plurality of network rendering devices; and
flag the questionable content with a comment indicating that there is doubt as to whether the questionable content can be rendered by any of said plurality of network rendering devices.

17. A network comprising the device of claim 15 and at least one network rendering device.

18. The device of claim 15, wherein the removed information is accessible for determining upgrades of the network.

19. The device of claim 15, wherein the removed information are hidden content hidden from a user, and a human-perceptible explanation is provided to the user of why content removed by the at least one filtering element is unusable by any of the plurality of network rendering devices.

* * * * *